Figure 1:
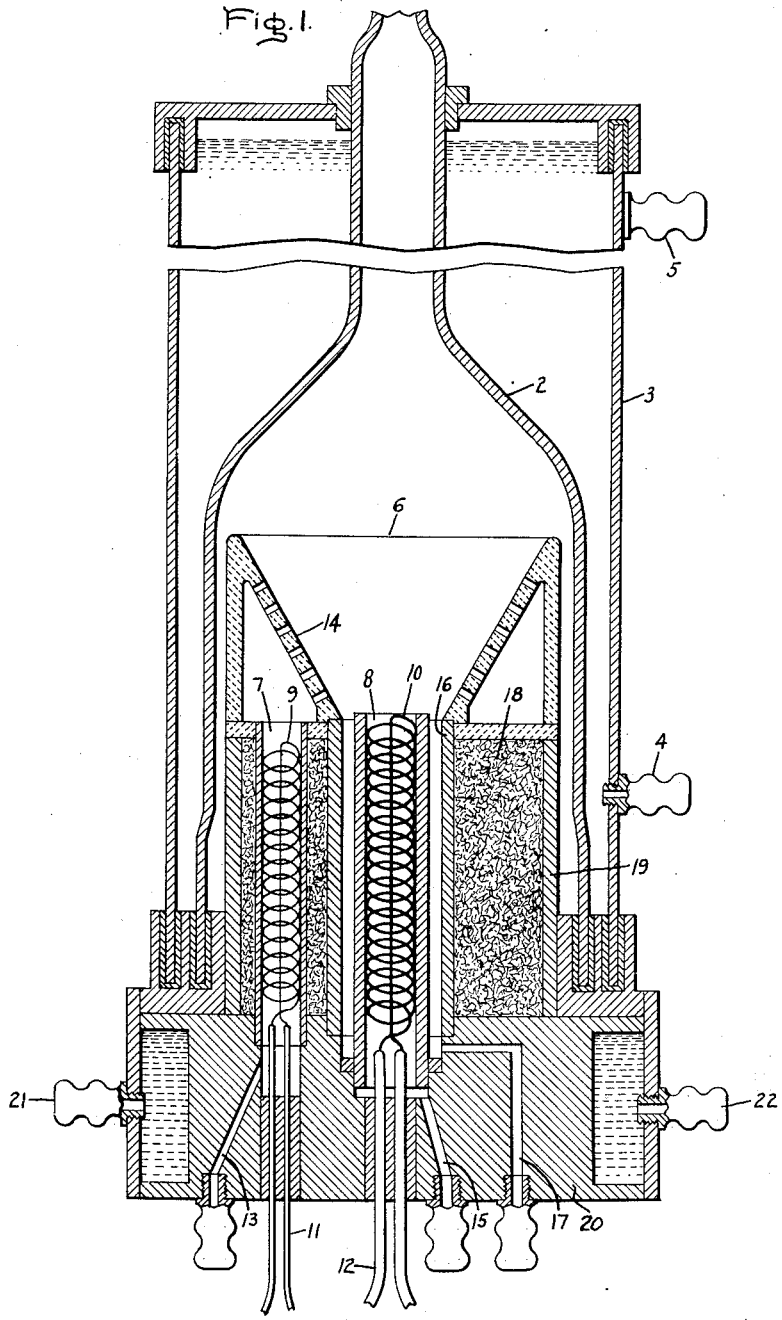

July 25, 1939.  R. AUERBACH  2,167,471
GAS REACTION METHOD
Filed Sept. 25, 1935  2 Sheets-Sheet 1

Inventor:
Rudolf Auerbach,
by Harry E. Dunham
His Attorney.

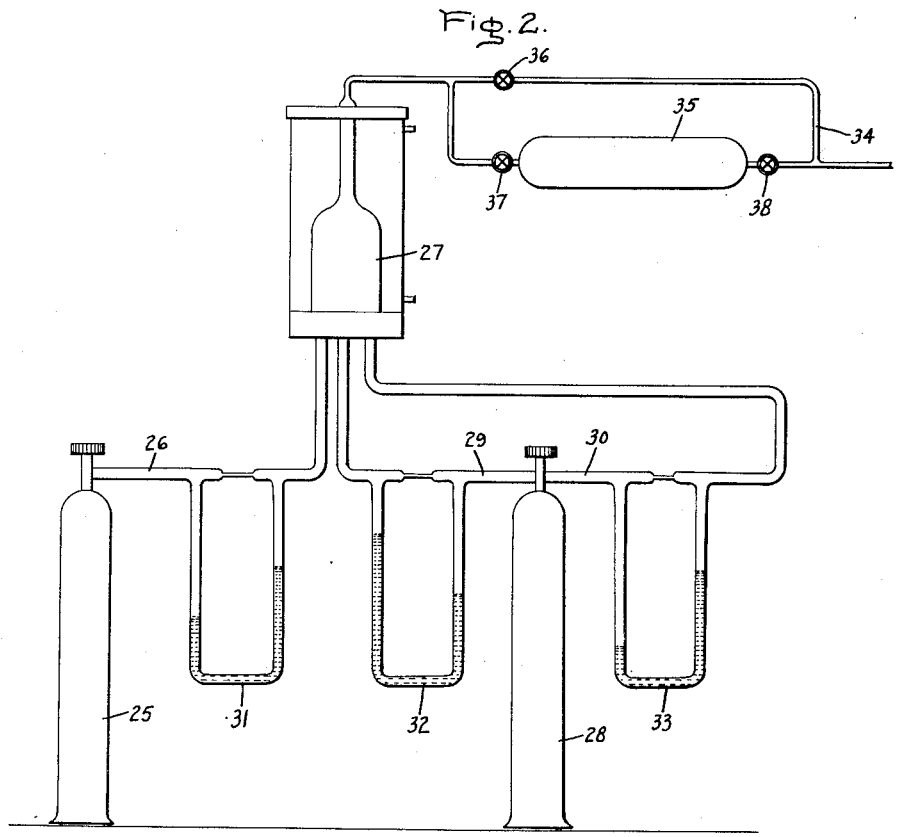

Patented July 25, 1939

2,167,471

UNITED STATES PATENT OFFICE 2,167,471

GAS REACTION METHOD

Rudolf Auerbach, Neuenhagen, Berlin, Germany, assignor to General Electric Company, a corporation of New York Application September 25, 1935, Serial No. 42,106
In Germany September 25, 1934

3 Claims. (Cl. 260—679)

The presnt invention relates to the carrying out of chemical reactions in the gaseous phase, such for example, as the pyrolysis of hydrocarbon gases. It is the object of my invention to improve the efficiency of such reactions.

When carrying out a gaseous reaction, as for example, the thermal conversion of a saturated hydrocarbon, such as methane, into a modification for example, to an unsaturated form of hydrocarbon, such as acetylene or ethylene, in accordance with my invention at least part of the required heat is supplied by an auxiliary, or foreign gas, such for example, as hydrogen.

My invention will be further explained in connection with the accompanying drawings in which Fig. 1 is a vertical section of a gas conversion apparatus, and Fig. 2 is a diagrammatic representation of an installation as a whole.

Referring to Fig. 1, the gas reaction is carried out in a sealed receptacle 2 which is surrounded by a cooling housing 3, a suitable cooling fluid being supplied by the inlet and outlet conduits 4, 5.

Within the receptacle 2 is a refractory gas reaction device 6 which is provided with gas-conveying ducts 7, 8 in which are located electric heaters, such for example, as helices 9, 10 of tungsten, chrome-nickel or other suitable refractory metal. Current-conveying terminals 11, 12 are provided as usual. Other suitable heating means, including arc devices can be used. Methane, or other gas to be reacted, may be supplied by an inlet tube 13 to the conduit 7, the walls of which may consist of silica, or other suitable refractory material. The methane or other gas to be reacted may be heated in the conduit 7 to a temperature of 800 to 900° C. The heated gas passes through a perforated diaphragm 14 consisting of suitable refractory material, such as soapstone, alumina or the like. In the space above the device 6 the heated gas encounters highly heated hydrogen flowing from the conduit tube 8, the walls of which may consist of zirconium oxide. The hydrogen is supplied by an inlet tube 15. Surrounding the conduit tube 8 is a second spaced tube 16 the walls of which also may consist of zirconium oxide. A second current of hydrogen supplied by the inlet tube 17 passes through the space surronding the tube 8 which serves to cool the tube 8, absorbing heat therefrom, and then mixes with the hydrocarbon gas. Heat insulation 18 consisting of prefired magnesia, or the like is provided in a surrounding housing 19. The base 20 of the apparatus may be cooled by fluid supplied by the ducts 21, 22.

The entire assembly is shown in Fig. 2, hydrocarbon gas flowing from the supply flask 25 through the conduit 26 to the reaction chamber 27. Hydrogen flows from the flask 28 through the conduits 29, 30. Flow meters 31, 32 and 33 are provided as indicated. The speed of flow of the gases may be under 20 liters per hour per square centimeter. The gas reaction product is carried away by a conduit 34 in parallel with which is arranged a gas flask 35 which may be filled by closing the valve 36 and opening the valves 37 and 38. When the flask 35 is filled with gas, the valves 37 and 38 are closed. The flask may be removed when filled with gaseous products and sealed.

When hydrogen is used as the auxiliary heat conveying gas, its temperature may be increased to a value at which atomic hydrogen is formed, which then surrenders in the gas reaction space the heat released by the recombination of the atomic hydrogen to molecular hydrogen.

One of the advantages of this arrangement lies in the possibility of obtaining any desired temperature in the gases to be reacted without disturbing catalysis of the material of the wall of the conduits and without undesired secondary reactions, such for example, as the formation of soot.

What I claim as new and desire to secure by Letters Patent of the United States is:

1. The method of converting methane to acetylene which consists in heating said methane to about 800 to 900° C., and mixing with said preheated gas atomic hydrogen, said hydrogen being at a temperature higher than the temperature of the methane and being of sufficient amount to cause the desired conversion of said methane to acetylene.

2. A process of thermally converting a gaseous saturated hydrocarbon such as methane and the like to a modification which comprises converting hydrogen to atomic state and bringing the same into intimate contact with the gaseous hydrocarbon to be thermally converted, the former gas being at a temperature substantially above the latter and the latter gas being below reaction temperature prior to association with the former and being brought to reaction temperature solely by intimate contact with the more highly heated hydrogen in atomic state.

3. A process of converting a saturated hydrocarbon such as methane and the like to an unsaturated hydrocarbon such as acetylene, ethylene and the like which consists in heating a gas comprising such saturated hydrocarbon below the required reaction temperature, separately heating molecular hydrogen at a temperature sufficient to convert it to atomic state, the atomic hydrogen thereby obtained being at a temperature above the temperature of reacting the said saturated hydrocarbon, and mixing with the first-named gas the more highly heated atomic hydrogen in an amount sufficient to raise the said gas to reaction temperature and to produce the desired conversion, said conversion being facilitated by the heat released by the recombination of the atomic hydrogen to molecular hydrogen.

RUDOLF AUERBACH.